United States Patent [19]

Binz et al.

[11] Patent Number: 4,512,014
[45] Date of Patent: * Apr. 16, 1985

[54] TIME SLOT MULTIPLEX SYSTEM FOR THE DIVISION MULTIPLEXING OF DIGITAL COMMUNICATION SIGNALS

[75] Inventors: Reiner Binz, Hohenschäftlarn; Norbert Pointner, Germering, both of Fed. Rep. of Germany

[73] Assignee: Siemens Aktiengesellschaft, Berlin and Munich, Fed. Rep. of Germany

[ * ] Notice: The portion of the term of this patent subsequent to Nov. 16, 1999 has been disclaimed.

[21] Appl. No.: 175,692

[22] Filed: Aug. 6, 1980

[30] Foreign Application Priority Data

Aug. 24, 1979 [DE] Fed. Rep. of Germany ....... 2934379

[51] Int. Cl.³ .................................................. H04J 3/02
[52] U.S. Cl. ......................................... 370/84; 370/68
[58] Field of Search .............................. 370/84, 68, 66

[56] References Cited

U.S. PATENT DOCUMENTS 3,987,251  10/1976  Texier et al. ......................... 370/84
4,068,098   1/1978  Thyselius ............................. 370/84
4,071,701   1/1978  Leijonhufvud et al. ............... 370/84
4,168,401   9/1979  Molleron et al. ..................... 370/84
4,258,434   3/1981  Glowinski et al. ................... 370/84

Primary Examiner—Douglas W. Olms
Attorney, Agent, or Firm—Hill, Van Santen, Steadman, Chiara & Simpson

[57] ABSTRACT

A time slot multiplex device for a time division multiplex system having a voice memory for storing data words received on an input multiplex line, and a control memory for controlling the reading of said voice memory to an output multiplex line, incorporates logic circuitry for generating a plurality of associated pairs of addresses, one for said control memory and one for said voice memory, corresponding to a plurality of equally spaced time slots for a multi-channel connection to said output multiplex line of relatively high band width, in response to a single pair of associated addresses furnished by a higher ranking control means and a logic circuit which, in association with a time slot counter, generates the required addresses during cycling of the time slot counter through a single frame of the time division multiplex system.

10 Claims, 7 Drawing Figures

TIME SLOT MULTIPLEX SYSTEM FOR THE DIVISION MULTIPLEXING OF DIGITAL COMMUNICATION SIGNALS

FIELD OF THE INVENTION

The present invention relates to a time slot multiplex system for time division multiplexing of communication signals, and more particularly to such a system employing delta modulated digital communication signals.

THE PRIOR ART

Frequently communications channels carrying time division multiplex communication signals are required to carry signals which have bit rates of different levels, corresponding to different band widths of the signals. Some communications channels may have bit rates which are multiples of the basic bit rate of the channel by a factor of $2^n$ wherein n is a whole number. When the basic bit rate is defined by the frame rate, the bits or characters of channels carrying larger band widths than the basic bit rate appear as character elements which are separated by equal time intervals, there being $2^n$ characters per pulse frame.

It is generally known that channels of different band widths may be transmitted by the same transmission line by the combining of an appropriate multiple of individual channels.

Apparatus is also known for permitting the shifting of information from one time slot to another, when digital time division multiplex communication is used, and such systems are generally referred to as time slot multiplex systems. They comprise a buffer memory which is referred to as a voice memory, into which the message signals are read from the incoming multiplex line during a complete pulse frame. This occurs preferably cyclically, and the information is read out from the buffer memory with a generally different sequence which corresponds to their chronological order within the pulse frame of the outgoing multiplex line. A control memory serves for the control of the read out of information from the voice memory, the control memory storing the addresses of the voice memory which correspond to the time slots of the incoming multiplex line together with addresses for the corresponding time slots of outgoing multiplex line. The control memory is cyclically driven by means of a time slot counter, and, by addressing the voice memory in the appropriate order, generates the sequence with which the message signals contained in the voice memory are read out to the outgoing multiplex line.

Each memory cell of the control memory stores a voice memory address in association with an address of the control memory, and this content does not change during the duration of the communication transmission corresponding thereto. In this way, the control memory stores and manifests the allocation of incoming time channels and outgoing time channels which are to be connected, during the term of such connection. The control memory is thus sometimes referred to as a holding memory, which is descriptive of this function.

The writing in to the control or holding memory of the voice memory addresses corresponding to the various time slots is performed under the control of a higher ranking control means, which responds, for example, to a link determining circuit. The higher ranking control means, which typically comprises a computer, supplies data into address registers which are associated with the control memory. With the assistance of a sequence control, the voice memory addresses supplied to the address registers are stored in the control memory in association with the corresponding addresses of the control memory.

In the case of broad band message signals, having a bit rate which is a multiple of the basic frame rate of the multiplex system, the operation by which the voice memory addresses are loaded into the control memory must be repeated a multiple of times, in accordance with the multiple $2^n$. This operation ties up the higher ranking control means for a comparatively long period of time, especially for channels which are relatively large in band width. During the time that the higher ranking control means is tied up in connection with the loading of the control memory, it is not available for other routines, and it is therefore desirable to provide a mechanism for shortening as much as possible the time requirements on the higher ranking control means during the loading of the control memory.

The German OS Patent Publication No. 2,558,599 describes a circuit arrangement for the through-connection of PCM words with different bit rates. There, the addresses of the time slots belonging together in accordance with predetermined interlacing plans are loaded into a read only memory which functions as a control memory for addressing the voice memory. This read only memory contains the complete addresses of all incoming and outgoing channels, and requires a correspondingly high memory capacity.

In German Patent Publication No. OS 2,814,415, a further development of this circuit arrangement is described, in which addresses which go together to form a message channel of higher bit rate than the frame rate are independently derived. A read only memory is employed for this purpose, which contains code words which are characteristic for the combination of signals of differing bit rates, and which, through the use of suitable decoding means, influence the control memory for the generation of the primary channel addresses allocated to one another, in accordance with the interlacing plan.

These previous developments do not fully satisfy the need for a simple and effective means of loading the required addresses into the control memory, which is simple and inexpensive, and does not require an excessive amount of time of the higher ranking control means.

BRIEF DESCRIPTION OF THE INVENTION

A principal object of the present invention is to provide a mechanism for automatically generating equally separated addresses for the control memory corresponding to voice memory addresses required for the through-connection of message signals at a higher bit rate than the frame rate, this being carried out with simple and inexpensive apparatus, and not requiring excessive communication with the higher ranking control means.

In accordance with one embodiment of the present invention, this object is achieved by the through-coupling of time channels of relatively high bit rate in which the voice memory address corresponding to only one of the required addresses is provided by the higher ranking control means, and apparatus is provided for generating the other required addresses without the need for further communication with the higher ranking control means.

The present invention incorporates a register for receiving the single address from the higher ranking control means, together with means for storing an indication of the desired multiple which characterizes the bit rate of the associated channel.

The present invention incorporates the logic circuit which is responsive to the address register receiving data from the higher ranking control means, and also responsive to a time slot counter for automatically generating the required control memory addresses and writing them into the control memory in association with the appropriate address of the time slots associated with the incoming multiplex channel. In this way, the time slot counter which is provided for the cyclical addressing of the control memory, is employed as a component of an address generator for automatically generating addresses required to be stored in the control memory for proper operation of the system.

The present invention makes use of the fact that a binary representation of time slots which are equally spaced and are multiples of the frame rate by factors $2^n$, are different only with respect to specific binary bits. For example, in a pulse frame which has 1024 time channels, the ordinal numbers of the individual time channels, that is, the channel addresses, are identified by a 10 bit binary number. If a channel having a higher bit rate by a factor of 2 is to be composed, the difference between the ordinal numbers of the two time slots in each frame differs by the value of 512. This means that the addresses of both time slots are identical, except for the highest binary bit. In a case of a time channel of a higher bit rate which has four equally distant time slots, the difference in the binary representation of the successive time slots is the value 256. Accordingly, the address bits coincide with each other except for the two most significant bits. In the same way, a communication channel having eight time slots equally spaced within a pulse frame have addresses which differ from each other only in the three most significant binary bits.

In one embodiment of the present invention, a comparator is employed for comparing the unchanging bits of the addresses with the corresponding bits of the time slot counter. When a coincidence is detected, the comparator supplies a pulse to the sequence control unit which causes the control memory to write a complete address of the voice memory into its memory at the appropriate time. The number of significant inputs from the address register to the comparator are controlled by a storage device which stores an indication of the desired multiple of the basic frame rate. Logic circuitry is provided using, for example, OR-gates bridging the comparator elements for certain bits, depending on the desired multiple, so that a coincidence or comparison is simulated each time the time slot counter reaches a state which corresponds to the address of a time slot corresponding to the data channel loaded into the address register at that time.

In accordance with another embodiment of the present invention, a plurality of change-over means or multiplexers are used to supply some of the binary digits making up a complete address of the voice memory, under control of the address supplied by the higher ranking control means, and the register storing the desired multiple. The change-over means is controlled by the address register and the signals identifying the desired multiple in such a manner as to generate the complete address of the voice memory which is to be written into the control memory.

In another embodiment of the present invention, the required addresses for the control memory may be generated by means of a plurality of change-over means instead of by means of time slot comparison (with simulation of coincidences). The change-over means, functioning as two-channel multiplexers, generate the required control memory addresses by way of an address bus, for controlling the writing of the control memory.

These and other objects and advantages of the present invention will become manifest by a review of the following description and accompanying drawings.

BRIEF DESCRIPTION OF THE DRAWINGS

Reference will now be made to the accompanying drawings in which.

DESCRIPTION OF THE PREFERRED EMBODIMENTS OF THE INVENTION

Figure 1:
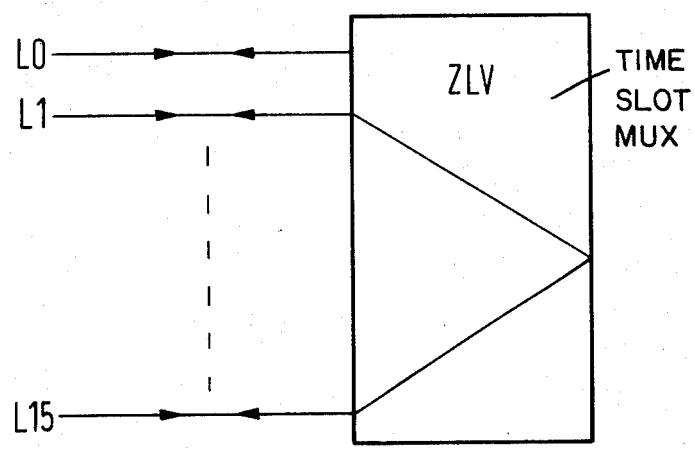
FIG. 1 is a functional block diagram of a time slot multiplex unit for the through-coupling of lines carrying message signals of differing bit rates.
Figure 3:
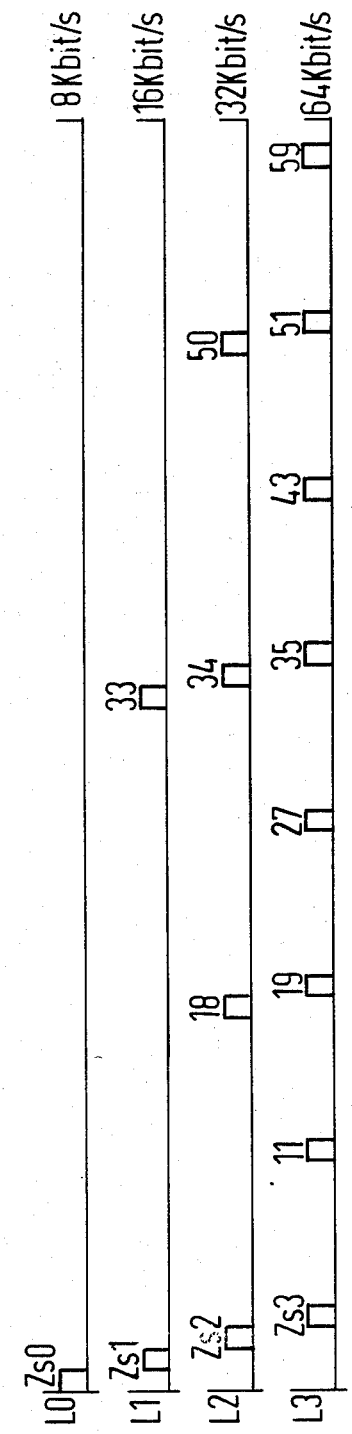
FIG. 3 is a diagram of the relative positions of time slots associated with four channels of the multiplex system, including a chart showing, for each time slot, the line number, and the control memory address associated therewith.

Referring now to FIG. 1, a time slot multiplex unit ZLV is illustrated, to which lines L0 through L15 are connected. The time slot multiplex unit ZLV functions to couple the lines together to allow for through-coupling of digital message signals from one line to another, the specific lines which are interconnected being designated by a higher order control means (not shown). FIG. 3 illustrates the bit rates of four of the lines L0 through L3. Assuming a frame rate of 8,000 frames per second, the bit rate on the line L0 is 8 K bits per second, the bit rate on the line L1 is 16 K bits per second, the bit rate on the line L2 is 32 K bits per second, and the bit rate on the line L3 is 64 K bits per second. As seen in FIG. 3, line L0 has one time slot per frame, line L1 has two time slots per frame, and lines L2 and L3 have four and eight time slots per frame, respectively. Each of the time slots is equally spaced, and in the example illustrated in FIG. 3, 1024 time slots make up a complete frame. FIG. 3 includes a table, shown in alignment with the time slots on lines L0 through L3, which correlates the various time slots with the line numbers and the position in the frame in terms of the 1024 bits which make up a single frame. In the example shown in FIG. 3, it is seen that each time slot extends over 17 consecutive bit positions of the frame. Accordingly, each time slot can accommodate a multiple bit word, the bits of which are transmitted serially along one of the associated lines L0 through L15.

Figure 2:
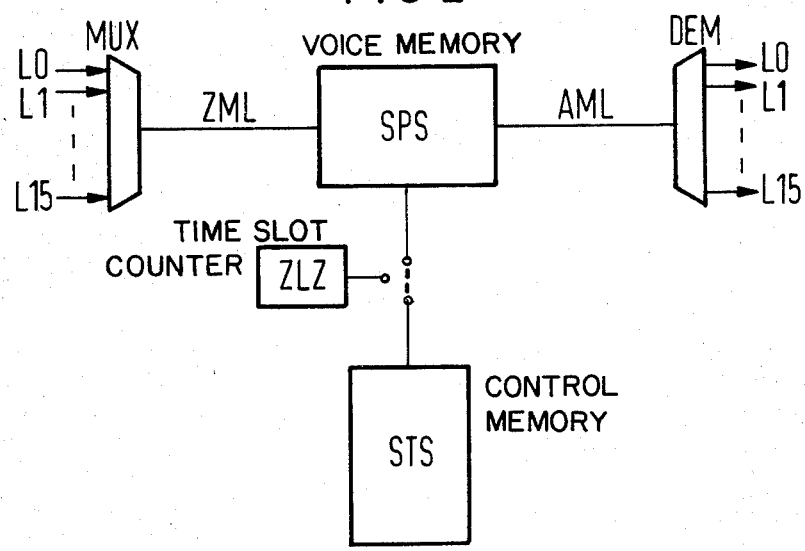
FIG. 2 is a more detailed functional block diagram of the apparatus of FIG. 1.

Referring now to FIG. 2, a functional block diagram of the time slot multiplex unit ZLV is illustrated. The incoming lines L0 through L15 are connected to a multiplex unit MUX which chronologically interlaces the message signals incoming on these lines in such a manner that they assume the time position illustrated in FIG. 3 on the line ZML which is connected to the output of the multiplex unit MUX. The line ZML is referred to hereinafter as the incoming multiplex line, and it is connected to a voice memory SPS which stores the data arriving on the incoming multiplex line ZML in a digital memory. The writing to the voice memory SPS occurs cyclically, during each of the 1024 bit positions of each frame, associated with the lines L0–L15 which are supplying incoming data. Also during each frame, the voice memory SPS is read out to an outgoing multiplex line AML, which is connected to a demultiplexer DEM. The demultiplexer DEM distributes the data on the outgoing multiplex line AML to the appropriate lines L0–L15, which are designated to receive the information originating on the lines L0–L15. The order in which the memory cells of the voice memory SPS are read out to the line AML is under the control of a control memory STS, which is cyclically driven by means of a time slot counter ZLZ. The control memory STS stores addresses of the voice memory SPS associated with the time slots during which data stored at those locations is to be read out to the outgoing line AML, and such data is read out at the time slots identified by the time slot counter ZLZ. The manner in which the time slot counter ZLZ is connected with the rest of the system is described in detail hereinafter.

The content of the control memory STS is derived from a higher ranking control means which represents link determinations, representative of the lines L0–L15 which are to be interconnected. This apparatus is well known and understood by those skilled in the art and therefore need not be described in detail herein. When switching of message signals is desired at a higher bit rate than the frame rate, a number of address locations must be entered into the control memory STS at memory locations corresponding to equally spaced designations of the time slot counter ZLZ, so that data may be read from the voice memory SPS at time slots corresponding to a given one of the lines L0–L15 which is to receive the data from the demultiplexer DEM. If each of such addresses must be independently entered into the control memory STS by the higher order of control means, a considerable period of time is required, during which the higher ranking control means is not available for other tasks. By use of the present invention, most of the addresses required for the control memory STS are automatically generated, during which communication from the higher ranking control means is not required.

Figure 4:
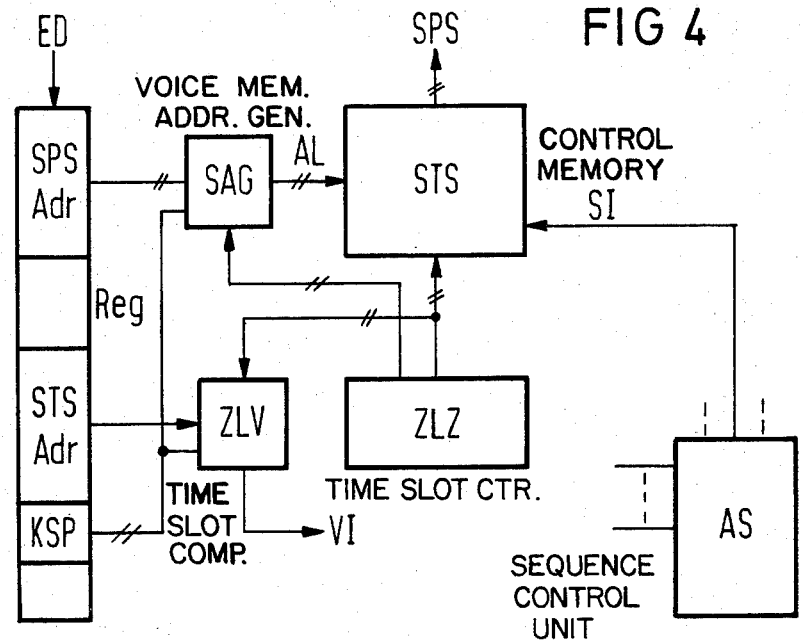
FIG. 4 is a functional block diagram of a circuit incorporating the present invention for writing information into the control memory.

FIG. 4 illustrates one embodiment by which the control memory addresses may be automatically generated, which addresses belong together to designate a multi-channel or broad band connection. A register Reg is provided into which data ED is supplied by higher ranking control means (not shown). The register Reg has a section for storing an address for the voice memory, designated SPS-Adr. Another part of the register Reg, which stores an associated address of the control memory, is indicated as STS-Adr. The register Reg also has provision for storing an indication of the desired multiple for a multi-channel or broad band connection. This indication specifies whether the connection to be through-coupled is a single channel, using a single time slot, or a multi-channel in which several time slots are used during each frame.

The outputs of the register section STS-Adr are connected to inputs of a time slot comparator ZLV, which also has a set of inputs connected to the outputs of the time slot counter ZLZ. A comparator ZLV compares the two inputs, and issues a comparison pulse VL when a coincidence is recognized. The comparison VI is connected to a sequence control unit AS, which undertakes a writing procedure effective to write information into the control memory STS. In FIG. 4, the sequence control is shown connected to the control memory STS by a line which delivers a write pulse SI to the control memory STS.

The details of the sequence control unit AS depends on the type of memory employed for the control memory STS, and on system considerations which may require generation of the write pulse in a different form, or at a slightly later time than the coincident pulse VI. The sequence control unit AS is therefore shown in FIG. 4 as a unit having multiple inputs and outputs as may be required for proper control of the control memory STS in response to the comparison pulse VI. In a simple, generalized, case, where the VI and SI pulses are identical, the comparator ZLV may be connected directly to the write controlling input of the control memory STS.

A particular memory location in the control memory STS is addressed by the output of the time slot counter ZLZ, and at this location, the address of the voice memory, stored in SPS-Adr, is written into the data section of the control memory STS through a voice memory address generator unit SAG via a data bus AL. The unit SAG modifies the voice memory address stored in the register Reg in accordance with the state of the higher order bits of the time slot counter ZLZ, as described hereinafter.

It will be understood that each storage location in the control memory STS, addressed by the time slot counter ZLZ, has the capacity of storing multiple bits of information, so that all of the address data generated by the SAG unit can be stored at a single storage location in the control memory which corresponds to the time slot being designated at any time by the time slot counter ZLZ.

During data entry into the control memory STS, the time slot counter ZLZ is cycled through an entire frame, by being supplied with clock pulses from a source (not shown). Each time a comparison is recognized by the comparator ZLV, the desired information is stored at an appropriate location of the control memory, addressed by the counter ZLZ, without any change in the data being stored in the register Reg. After the time slot counter has been cycled through one frame, new data ED is entered into the register Reg and the process repeated, so that the control memory is loaded with information corresponding to a second communications channel to which an output is to be connected. Thus, only one data entry ED is required for each output line L0–L15, irrespective of the bit rate multiple of such line.

This process is repeated for all of the output channels, after which the control memory is in condition to control the distribution of the data to the output multiplex line AML, which is performed by the continuous cycling of the time slot counter ZLZ. For each time slot for which data is to be read out to the output multiplex line AML, the control memory STS supplies the appropriate address to the voice memory so that the appropriate data can be read out during that time slot.

The lines which in FIG. 4 are representative of plural lines for conveying parallel data bits are designated by cross-hatching, in the conventional manner.

Figure 5:
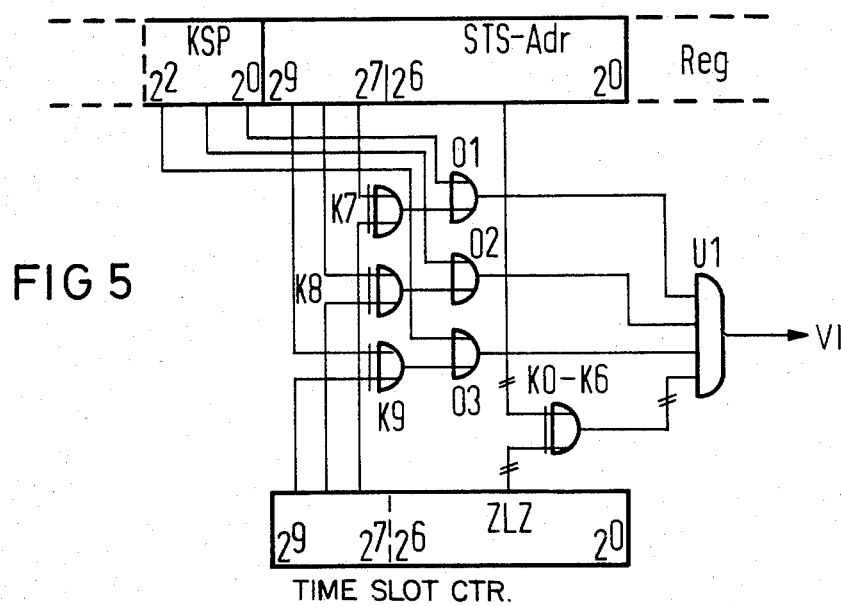
FIG. 5 is a functional block diagram of a time slot comparator incorporated in the apparatus of FIG. 4.

FIG. 5 illustrates a detailed circuit diagram of an embodiment of the comparator ZLV. It incorporates coincidence elements K0 through K9, OR elements 01 through 03, and an AND-gate U1. The coincidence elements K0–K6 are each connected to corresponding bits of the time slot counter ZLZ and the STS-Adr section of the register Reg. Although 7 units are connected in that manner, only one is illustrated in FIG. 5, with the cross-hatched lines indicating multiple parallel connections. All of the output connections are connected as inputs to the AND-gate U1, so that, when the other inputs to the gate U1 are high, an output VI is produced during the period when coincidence is recognized between the lower order 7 bits of the STS address and the time slot counter. The three higher order bits of the STS address and the time slot counter ZLZ are each connected individually to inputs of three coincidence units K7 through K9, and the outputs of each are connected to an input of one of the OR-gates 01–03. The other inputs of the OR-gates are derived from outputs of the KSP section of the register Reg, and the three OR-gates supply three additional inputs to the AND-gate U1.

The three bits stored in the KSP section of the register have the following significance:

000: one entry
100: two entries
110: four entries
111: eight entries

The comparator illustrated in FIG. 5 functions in the following manner. When KSP stores 000, the AND-gate U1 supplies the comparison pulse VI to the sequence control unit AS only when the output of the time slot counter ZLZ coincides in all binary bits with the ten bits of the STS address stored in the register Reg. This occurs only once per frame.

In the case where the KSP part of the register stores 100, the OR-gate 03 for the highest order bit, manifests a continuous output, thereby disabling the coincidence unit K9 for the highest order bit of the time slot counter and the STS address. Accordingly, two comparison pulses VI are produced during each frame, since the nine lower order bits coincide twice during each frame, corresponding to two equally spaced control memory addresses.

When KSP stores 110, both of the highest order coincidence units K8 and K9 are switched off, so that four equally spaced comparison pulses VI are produced. In the same way, when KSP stores 111, eight equally spaced comparison pulses are produced.

The coincidence units illustrated in FIG. 5 are shown as exclusive OR-gates, which produce a high output when one input represents a 1 and the other input represents a 0. Accordingly, the STS-Adr section of the register must store the complement of the desired time slot, in order to supply a coincidence pulse at the proper time. The data ED supplied by the higher order control means therefore supplies the complement of the time slot address, so that the comparison pulse VI is produced at the proper time. Alternatively, comparison units may be used which function as exclusive NOR-gates, which produce high outputs when both inputs have the identical binary significance.

Figure 6:
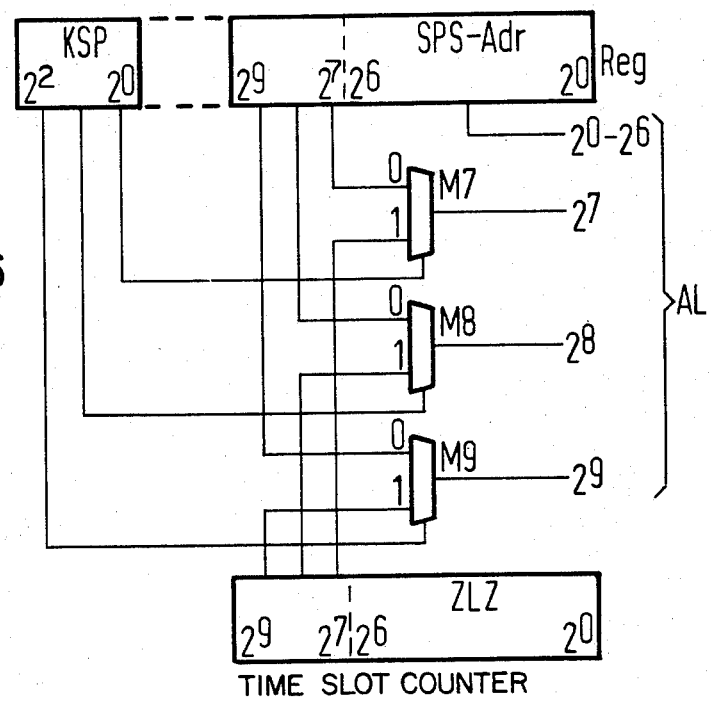
FIG. 6 is a functional block diagram of an alternative apparatus for generating voice memory addresses to be written into the control memory.

FIG. 6 illustrates a detailed block diagram of apparatus for generating equally spaced voice memory addresses. It incorporates three units M7–M9 which may be multiplex units each having two input channels and one output channel. One of the two inputs is connected to the output in accordance with the level applied to a control line, and the control lines of the units M7–M9 are connected to the three outputs of the KSP section of the register. When KSP stores 000, each of the units M7–M9 selects its upper input, as shown in FIG. 6, whereby the outputs of the units M7–M9 correspond with the three highest order bits of the SPS address stored in the register Reg. These three outputs, together with the outputs from the lower 7 bits of the SPS-Adr section of the register, supply the voice memory address to the control memory SPS over the lines AL. Accordingly, when KSP stores 000, only one voice memory address appears on the lines AL, that being the one stored in the SPS-Adr section of the register.

When KSP stores 100, the unit M9 associated with the highest order bit of the counter ZLZ, provides the highest order bit of the counter as the highest order bit on the data lines AL. Since the highest order bit of the time slot counter ZLZ is 0 during half of a frame and 1 during the other half, two addresses are designated by the lines AL during each frame, which addresses differ by 512 pulse times.

When KSP stores 110, the units M8 and M9 associated with the two highest order bits of the counter ZLZ supply the counter outputs as the two highest order bits on the lines AL. In this condition, the lines AL represent four different voice memory addresses, during the four quarters of each frame. In similar fashion, when KSP stores 111, the lines AL supply eight addresses during consecutive periods of one-eighth of a frame.

Since the apparatus shown in FIG. 5 emits equally spaced comparison pulses VI, it is apparent that the voice memory address stored at each location of the control memory, during cycling of the time slot counter ZLZ through a complete frame, will designate equally spaced time slots, in accordance with the indications stored in KSP. By this means, during each of the multiple time slots during each frame in which information is being read out to a channel with a high band width, the information is derived from different storage locations of the voice memory, which correspond to data arriving on an incoming line at a higher bit rate, or data from multiple incoming lines.

Figure 7:
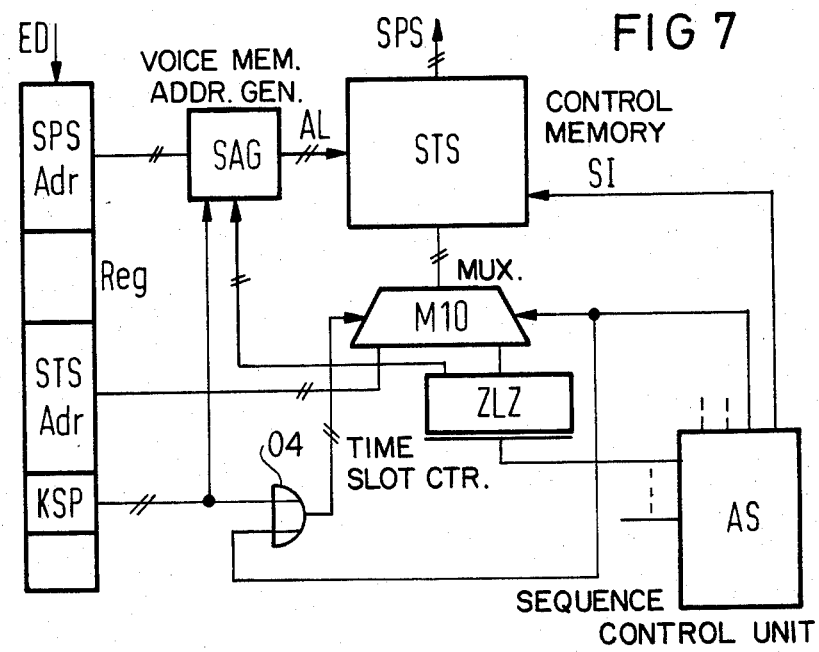
FIG. 7 is a functional block diagram of an alternative embodiment incorporating the present invention for controlling the control memory.

Referring now to FIG. 7, an alternative embodiment is illustrated for generating the addresses for driving the control memory STS. The system is similar to that illustrated in FIG. 4, except that a multiplexer M10 is employed for generating the STS addresses instead of the comparator as illustrated in FIG. 4. The multiplexer unit M10 contains a number of individual two-channel multiplexers each of which have one input connected to an output of the STS-Adr section of the register Reg, and the other input connected to the corresponding output of the time slot counter ZLZ. The multiplexer units associated with the three highest order bits are controlled by the three outputs of the KSP section of the register, in the identical manner illustrated and described in connection with FIG. 7.

As the time slot counter ZLZ is cycled through a complete frame, one or more addresses will appear on the output lines of the multiplexer unit M10, as described in connection with FIG. 6. When the bits stored in the KSP section of the register indicate multiple channel connections, a number of addresses are produced at the outputs of the multiplexer unit M10, depending on the desired multiple of the frame rate, and these addresses are manifested at the outputs of the multiplexer M10 at equally spaced intervals during each frame. The outputs of the KSP section are connected to the control inputs of the multiplexer units for the three highest order bits through OR-gates 04. During loading of the control memory, the other input of each OR-gate 04, which is connected from the sequence control unit AS, is low, so that the multiplexer M10 functions in the same manner as the apparatus of FIG. 6. Since only appropriate addresses are manifested at the output of the multiplexer unit M10, coincidence pulses are not required as in the apparatus of FIG. 4. However, multiple pulses are required during cycling of the time slot counter ZLZ in order to effect multiple writing of the control memory STS, so that the appropriate information is loaded into it. For this purpose, a connection from the time slot counter ZLZ is provided to the sequence control unit AS, which may be, for example, the output of the time slot counter which produces eight equally spaced pulses per frame. Since no more than eight separate addresses may be manifested at the outputs of the multiplexer M10 or on the lines AL, and these addresses are changed at equally spaced intervals during each frame, eight equally spaced pulses are ample to enter all of the necessary data into the control memory STS for one set of data ED supplied to the register Reg. Each of the eight pulses causes the sequence control unit AS to emit a write pulse SI, at eight equally spaced intervals during the frame, at which time information on the lines AL is written into the address identified by the multiplexer unit M10. In a case in which the bit rate multiple is indicated to be less than eight, some of the write pulses SI cause redundant writing of the same information, but this does not affect operation of this system.

Another output from the sequence control unit AS is connected to the control inputs of the individual multiplexer units for the lowest seven bits of the multiplexer M10, and through the OR-gates 04 to the control inputs for the other three multiplexer units. This output line is high during transmission operations, whereby cycling of the time slot counter ZLZ causes the sequential access to all of the locations in the control memory STS, so that the voice memory is controlled to supply the proper information to the outgoing multiplex line AML.

From the above, it may be seen that the higher ranking control means need enter only one group of data ED into the address registers Reg for any series of connections to one output line L0–L15, irrespective of the multiple involved. This represents a great saving of time for the higher ranking control means, and accordingly makes for more efficient operation of the overall system.

It is apparent that various modifications and additions may be made in the apparatus of the present invention without departing from the essential features of novelty thereof, which are intended to be defined and secured by the appended claims.

What is claimed is:

1. In a time division multiplex system for the through-coupling of digital communications signals, said communications signals being transmitted in time channels with bit rates which are multiples of the frame rate by $2^n$, where n is a positive integer, and wherein said communications signals are made up of digital character elements equally spaced within each frame, said time division multiplex system having an incoming multiplex line and an outgoing multiplex line, a voice memory into which communications signals are cyclically read from said incoming multiplex line, wherein the communications signals of a channel having a multiple bit rate occupy a plurality of separate memory cells, a control memory for cyclically addressing said voice memory for furnishing addresses to said voice memory for the read out of communications signals from said voice memory to said outgoing multiplex line, a time slot counter for cycling said control memory, and an address register for receiving and storing an associated pair of addresses for said control memory and said voice memory which are allocated to each other, a time slot multiplex unit, comprising;

a storage device for storing data representative of a bit rate;

a logic circuit having a first set of inputs connected to the highest order outputs of said time slot counter and a second set of inputs connected to a plurality of bits of one of the addresses stored in said address register;

and means for connecting an output of said storage device to said logic circuit as a control input, said logic circuit being responsive to said bit rate representing data for generating a plurality of addresses corresponding to time slots which include a time slot represented by address data stored in said address register and a plurality of other time slots, all of said time slots being equally spaced and totaling said multiple;

whereby the plurality of addresses required for storage of data in said control memory for said multiple bit rate are generated automatically in succession from a single such address in said address register during cycling of said time slot counter.

2. Apparatus according to claim 1, wherein said single address in said address register is an address for said control memory, and including means for connecting said logic circuit to the address inputs of said control memory.

3. Apparatus according to claim 1, wherein said single address in said address register is an address for said voice memory, and including means for connecting said logic circuit to the data inputs of said control memory.

4. Apparatus according to claim 1, wherein said logic circuit comprises a plurality of comparator elements, one for each bit of said single address, write pulse means connected to said comparator elements and responsive thereto for generating a write pulse for said control memory, and a plurality of OR-gates having one input connected to the outputs of the comparator elements for the higher order bits of said address and a second input connected to individual bit outputs of said storage device, said OR-gates having outputs connected to inputs of said write pulse means, whereby a comparison of said higher order comparison elements is simulated and plural equally spaced signals are supplied to said write pulse means.

5. Apparatus according to claim 1, wherein said logic circuit comprises a plurality of two-channel multiplexer units, one for at least the higher order bits of said single address, means connecting one data input to each of said multiplexer units to one of the bit outputs of said address register manifesting higher order bits of said single address, means connecting a second data input of each of said multiplexer units to a corresponding bit of said time slot counter, and means connecting control inputs of said multiplex units to the bit outputs of said storage device, whereby said plurality of addresses are made up of selected combinations of bits from said address register and from said time slot counter, in response to said multiple-representative data.

6. In a time division multiplex system for the through-coupling of digital communications signals transmitted in time channels with bit rates which are multiples of $2^n$ of the basic frame rate of said time division multiplex system, said multiplex system having a voice memory for storing communications signals present on an incoming multiplex line during the time slots of said time division multiplex system, a control memory for cyclically addressing said voice memory to cause the read out of data from said voice memory to an outgoing multiplex line, a time slot counter for addressing said control memory during successive time slots, and an addressing register connected to receive data to be stored in said control memory, a time slot multiplex unit comprising:

a storage device for storing data representative of said multiples;

a logic circuit connected to said storage device, to said address register, and to said time slot counter, for generating a plurality of equally spaced addresses; and writing means connected to said logic circuit for writing data from said address register into a plurality of addresses of said control memory for a single set of data stored in said address register.

7. Apparatus according to claim 6, wherein said logic circuit incorporates a comparator having one set of comparison inputs connected to said time slot counter, another set of comparison inputs connected to said address register, and a control input connected to said storage device, wherein the data stored in said storage device controls the number of bits which are effectively compared by said comparator, means responsive to a comparison of a plurality of bits of said time slot counter with corresponding bits stored in said address register for generating a comparison signal, said writing means being responsive to said comparison signal.

8. Apparatus according to claim 6, wherein said logic circuit includes a two-channel multiplex unit having one input connected to selected bits of said time slot counter and a second input connected to corresponding bits stored in said address register, said multiplex unit being controlled in accordance with the data stored in said storage device for supplying a plurality of output signals used by said writing means in accordance with a selected combination of the bits connected to the inputs of said multiplexing units.

9. Apparatus according to claim 6, wherein said logic circuit comprises a plurality of multiplex units having one input connected to selective outputs of said time slot counter, and another data input connected to corresponding bits of data stored in said address register, said multiplex unit being controlled in response to data stored in said storage device for manifesting addresses for said control memory which are composed partly of data stored in said address register and partly of the bits manifested by said time slot counter.

10. Apparatus according to claim 9, including logic means for selectively causing said multiplex units for manifesting outputs corresponding to all of the bits of said time slot counter, whereby said control memory is cycled through all of its storage locations, for controlling said voice memory.

* * * * *